(12) United States Patent
Wang et al.

(10) Patent No.: US 10,958,849 B1
(45) Date of Patent: Mar. 23, 2021

(54) METHOD FOR RAPIDLY STARTING UP AN IMAGE SENSOR AND AN IMAGING SYSTEM USING THE METHOD

(71) Applicant: SmartSens Technology (HK) Co., Limited, Kwun Tong Kowloon (HK)

(72) Inventors: Xiaoyong Wang, Shanghai (CN); Jin He, Shanghai (CN); Kai Hu, Shanghai (CN)

(73) Assignee: Smartsons Technology (HK) Co., Limited, Kowloon (HK)

( * ) Notice: Subject to any disclaimer, the term of this patent is extended or adjusted under 35 U.S.C. 154(b) by 0 days.

(21) Appl. No.: 16/773,440

(22) Filed: Jan. 27, 2020

(30) Foreign Application Priority Data

Jan. 15, 2020 (CN) .......................... 202010043641.0

(51) Int. Cl.
| | |
|---|---|
| *H04N 5/235* | (2006.01) |
| *H04N 5/243* | (2006.01) |
| *H04N 5/232* | (2006.01) |
| *H04N 5/353* | (2011.01) |
| *H04N 5/345* | (2011.01) |
| *H04N 5/347* | (2011.01) |

(52) U.S. Cl.
CPC ......... *H04N 5/2353* (2013.01); *H04N 5/2351* (2013.01); *H04N 5/2352* (2013.01); *H04N 5/2356* (2013.01); *H04N 5/23241* (2013.01); *H04N 5/23245* (2013.01); *H04N 5/243* (2013.01); *H04N 5/347* (2013.01); *H04N 5/3452* (2013.01); *H04N 5/3535* (2013.01)

(58) Field of Classification Search
CPC .......... H04N 5/23241; H04N 5/23245; H04N 5/2352; H04N 5/2353; H04N 5/2356; H04N 5/243; H04N 5/3452; H04N 5/347; H04N 5/3535
See application file for complete search history.

(56) References Cited

U.S. PATENT DOCUMENTS

2020/0394373 A1* 12/2020 Ligozat .............. G06K 7/10564

* cited by examiner

*Primary Examiner* — Daniel M Pasiewicz
(74) *Attorney, Agent, or Firm* — Eric Karich; Karich & Associates

(57) ABSTRACT

A method for rapidly starting up an imaging system and an imaging system using the method is provided by reducing the time required to acquire the AEC and AGC parameters required for visually appealing imaging. The method employs an initial fast frame rate and binning and skipping to determine AEC and AGC parameters for use in subsequent normal frame rate imaging.

20 Claims, 7 Drawing Sheets

| 610 | Ex-gain1 | Ex-gain2 | Ex-gain3 | Ex-gain4 | Ex-gain5 | Ex-gain6 | Ex-gain7 | Ex-gain8 |
|---|---|---|---|---|---|---|---|---|
| Exposure (ms) | 4 | 4 | 4 | 1.333 (i.e. 4/3) | 0.444 (i.e. 4/9) | 0.148 (i.e. 4/27) | 0.049 (i.e. 4/81) | 0.017 (i.e. 4/243) |
| Gain | 9 | 3 | 1 | 1 | 1 | 1 | 1 | 1 |

| 620 | Level$_1$ | Level$_2$ | Level$_3$ | Level$_4$ | Level$_5$ | Level$_6$ | Level$_7$ | Level$_8$ |
|---|---|---|---|---|---|---|---|---|
| Level$_i$ | 36 | 12 | 4 | 1.333 | 0.444 | 0.148 | 0.049 | 0.017 |

*Fig. 6*

METHOD FOR RAPIDLY STARTING UP AN IMAGE SENSOR AND AN IMAGING SYSTEM USING THE METHOD

BACKGROUND OF THE INVENTION

Field of the Invention

This invention relates generally to image sensors, and more particularly to CMOS image sensors. The image sensor may be incorporated within a digital camera.

Description of Related Art

An image capture device includes an image sensor and an imaging lens. The imaging lens focuses light onto the image sensor to form an image, and the image sensor converts the light into electrical signals. The electric signals are output from the image capture device to other components of a host electronic system. The image capture device and the other components of a host electronic system form an imaging system. Image sensors have become ubiquitous and may be found in a variety of electronic systems, for example, a mobile device, a digital camera, a medical device, or a computer.

A typical image sensor comprises a number of light sensitive picture elements ("pixels") arranged in a two-dimensional array. The image sensor two-dimensional array comprises a number n lines of pixels and m columns of pixels. By scanning all the lines of the array one time a single frame of image data is acquired. An image sensor may be configured to produce a color image by forming a color filter array (CFA) over the pixels. Typically, each pixel is overlaid with a monochromatic color filter which is in turn overlaid with a microlens to focus light on to a photodiode. An array of pixels made up of repeating blocks of pixels wherein the blocks are a two by two arrangement of four pixels overlaid with a red, blue and two green color filters comprise a well-known Bayer pattern CFA. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate these losses.

With the decreased pixel size, the total light absorbed within the pixel becomes diminished and some advanced features become challenged. Often the output resolution of the camera system is less than the resolution of the image sensor and then one way to increase the amount of light collected to represent a point in an image is to sum the signals from adjacent or nearby pixels which share the same color filter color. This is called pixel binning and may be used to increase sensitivity when an image is captured at low light levels.

In addition to an array of pixels, a typical image sensor substrate or chip further includes readout circuitry. Some portion of the readout circuitry may reside within each pixel depending on demands of a particular design. Two of the most common methods for reading off the image signals generated on a sensor chip are the rolling shutter mode and the global shutter mode. The rolling shutter mode involves sequentially exposing different lines of the sensor array at different times (typically one frame at a time) and reading out those lines in a chosen sequence. The global shutter mode involves exposing all pixels (a frame) simultaneously and for the same length of time, similar to how a mechanical shutter operates on a legacy "snapshot" camera. Prior art digital imaging systems have utilized either rolling shutter or global shutter readout modes.

Real-time image processing is difficult to achieve. This is due to several factors such as the large data set represented by an image and the complex operations which may need to be performed on the image. The frame rate is the number of frames per second in the output stream. The frame blanking time is the time between each frame during which the scan proceeds from the bottom line of one frame to the top line of the next frame. Pixels can also be binned or summed together to decrease the readout time of the image sensor. Pixel binning divides each input image into rectangular bins corresponding to individual pixels of the desired output image, averages pixel values in these bins and assembles the output image from the bin averages. Image cropping takes place when the sensor system is programmed to output pixel values from a rectangular portion of its pixel array, a window, smaller than the default maximum window. Pixels outside the selected cropping window are not read out, which results in a narrower field of than the default sensor settings. Sensors can be programmed to skip columns and or rows of the pixel array, that is, not sample them. A skip 2× mode skips one Bayer pair of pixels for every pair output. Rows and columns are typically read out in pairs. Binning reduces resolution by combining adjacent same-color imager pixels to produce one output pixel. Binning works in conjunction with skipping and only certain combinations of binning and skipping are allowed. Binning can be performed in the pixel array or after the signals are read out of the pixel array.

At real-time video rates of 30 frames per second, a single operation performed on every pixel of a color image can equate to tens of millions of operations per second. Many image processing applications require that several operations be performed on each pixel in the image, resulting in an even larger number of required operations per second. Typically an image signal processor (ISP) or digital image processor is implemented within the imaging to system for this purpose. It provides demosaicing to determine which color each pixel represents and to interpolate regions at and near pixels. It also may control autofocus, exposure, and white balance for the imaging system. The ISP may be included onboard the circuit wafer or as an added discrete chip. ISPs typically have an embedded CPU to execute its required functions.

CMOS image sensors employ an electronic shutter to control the exposure time (the length of time during which light can enter the sensor before the pixel is read out). The Automatic Exposure Control (AEC) circuit and the Automatic Gain Control (AGC) circuit are responsible for ensuring that optimal auto setting of exposure and analog gain are computed every frame. The digital image processor typically also provides the AEC and AGC level determinations. Automatic Exposure Control typically uses two major steps to refine the exposure level of the sensor system to a level of exposure where the image is visually appealing. AEC typically determines the desired exposure level by comparing a measured level to a stored level and then adjusts the time period in which the sensor array collects image data, i.e., the exposure time or integration time, to change the output value towards the stored level.

The typical widely used AEC and ACG processes require about eight frames of iterative image data capture and calculation in order to obtain values useful for starting up an imaging system. In a normal frame rate of 30 fps (frames per second) this amounts to about 200 ms. An opportunity for improvement of the startup of an imaging system exists in the need to reduce the startup time by decreasing the time required to acquire useable initial AEC and ACG values. The present invention fulfills these needs and provides further advantages as described in the following summary.

SUMMARY OF THE INVENTION

The present invention teaches certain benefits in construction and use which give rise to the objectives described below.

The present invention provides a method having advantages not taught by the prior art for rapidly starting up an imaging system by reducing the time required to acquire the AEC and AGC parameters required for visually appealing imaging. The method employs an initial fast frame rate and binning and skipping to determine AEC and AGC parameters for use in subsequent normal frame rate imaging.

An additional objective of the present invention is to provide an imaging system with a fast startup mode in about 10 ms by significantly reducing the time required to determine AEC and AGC parameters for normal rate imaging.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention:

FIG. 6 is pair of tables identifying the eight pairs of initial exposure time and gain parameters and their product levels enabling the rapid startup method according to an embodiment of the present invention.

DETAILED DESCRIPTION OF THE INVENTION

The above-described drawing figures illustrate the invention, a method for rapidly starting up an imaging system by reducing the time required to acquire the AEC and AGC parameters required for visually appealing imaging. The method employs an initial fast frame rate and binning and skipping to determine AEC and AGC parameters for use in subsequent normal frame rate imaging.

In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

The terms "connected" and "coupled," which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor).

Figure 1:
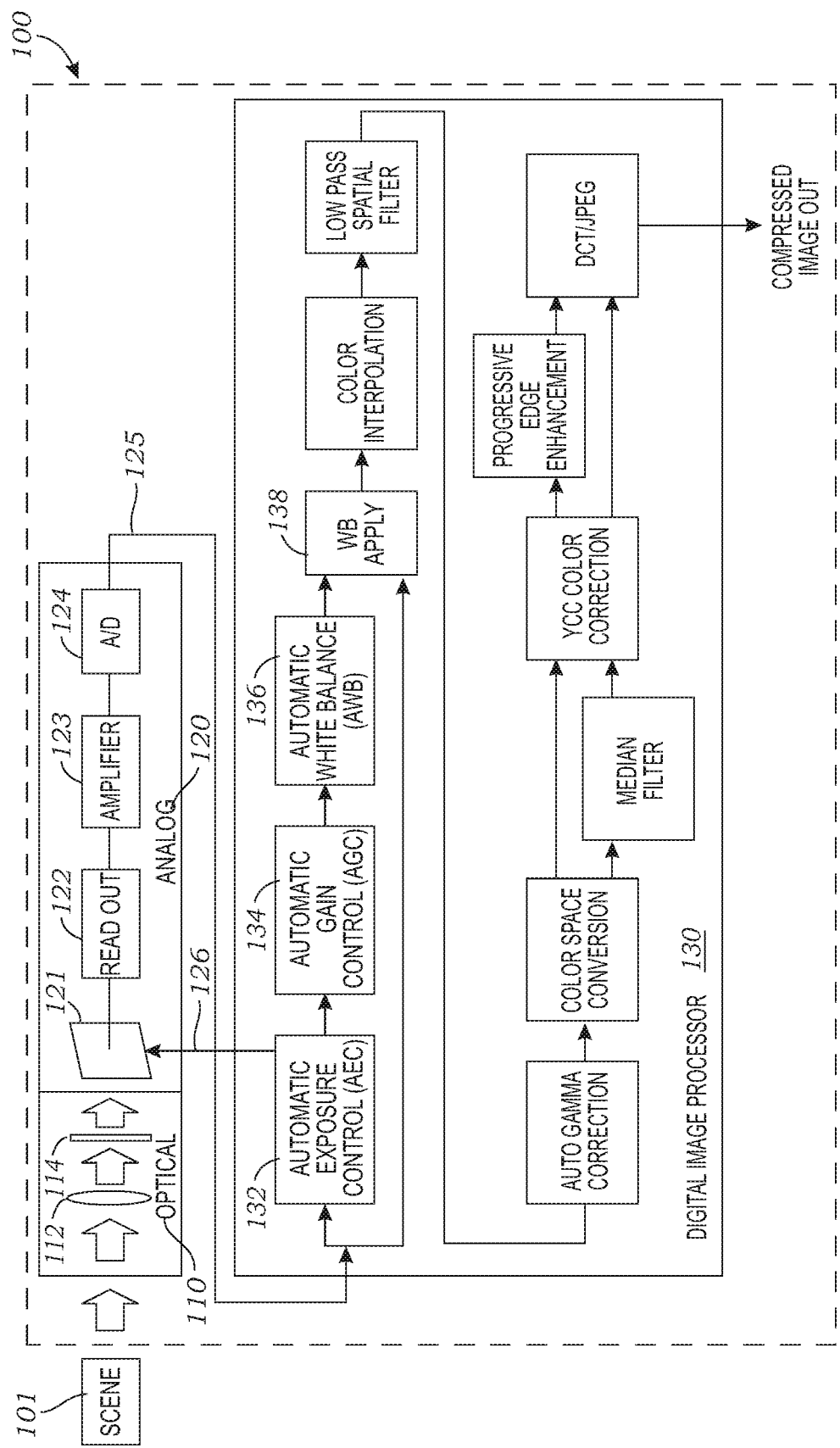
FIG. 1 illustrates a block diagram of a digital imaging system including AEC and ACG determining blocks in the prior art.

FIG. 1 illustrates a block diagram of a digital imaging system 100 including AEC and ACG determining blocks in the prior art. FIG. 1 shows image sensor analog section 120 capturing imaging data representing a scene 101 through optical section 110. Optical section 110 comprises an optical lens 112 to focus scene 101 onto a color filter array 114. Color filter array (CFA) may be a Bayer pattern or another pattern. Analog section 120 comprises photosensor array 121 which captures imaging data to be read out by readout circuit 122 and amplified by amplifier 123 and then digitized by analog-to-digital (A/D) converter 124. The output of A/D converter 124 enters digital image processor 130 via line 125 and is fed to both Automatic Exposure Control (AEC) 132 and WB Apply 138. The output of AEC 132 is fed to Automatic Gain Control (AGC) 134 and fed back to photosensor array 121 via feedback path 126 to control the exposure time. Based on the level of exposure, AGC 134 automatically adjusts the gain applied by the amplifier to the captured imaging data signal. The output of AGC 134 is fed to Automatic White Balance (AWB) 136 and then fed to WB Apply 138. The output of WB Apply 138 proceeds as shown in FIG. 1 through Color Interpolation, Low Pass Spatial Filter, Auto Gamma Correction, Color Space Conversion, Median Filter, YCC Color Correction, Progressive Edge Enhancement, and DCT/JPEG which provides a Compressed Image Out. The JPEG compressed output image will typically go to a file storage medium within the imaging system.

Figure 2:
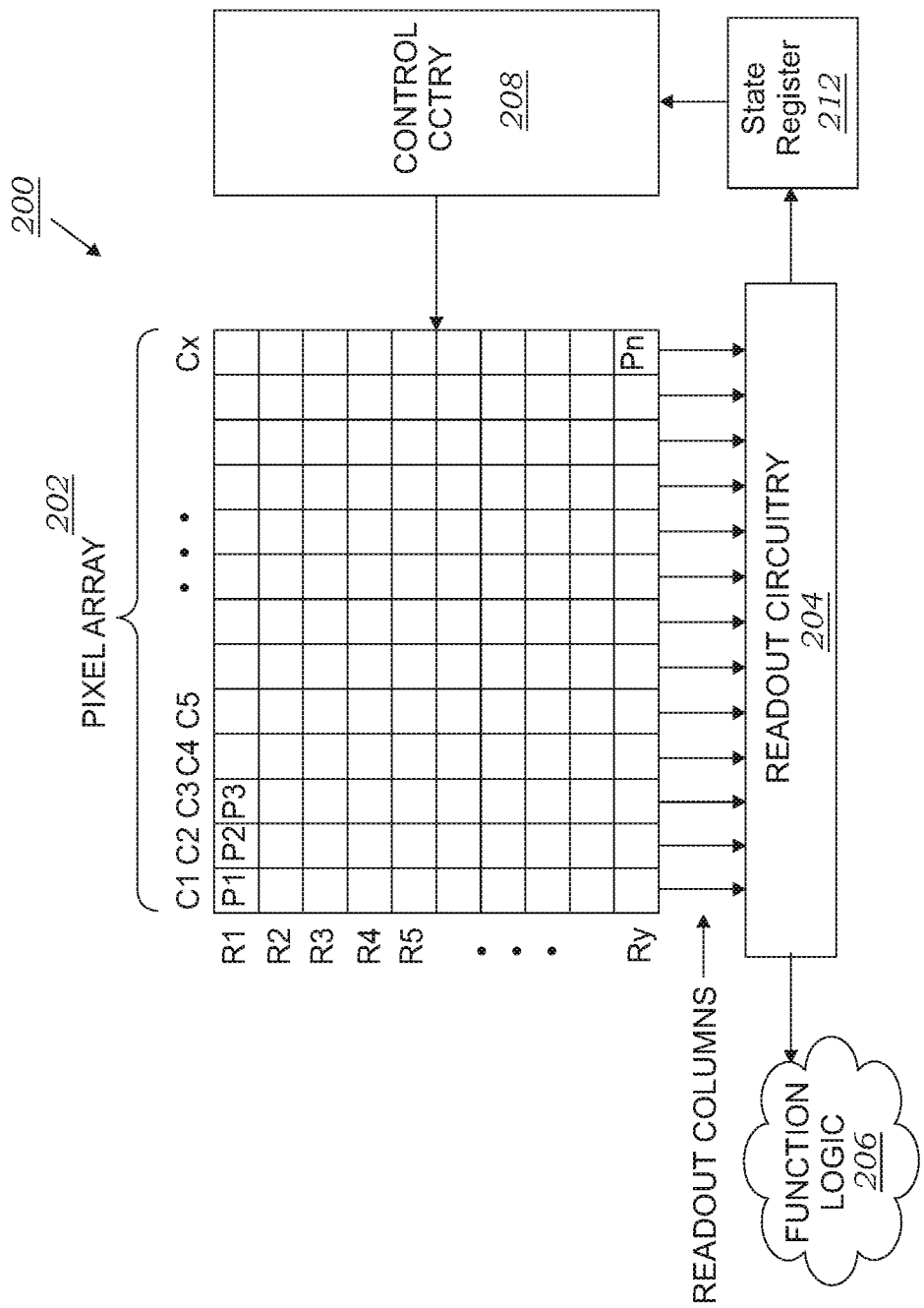
FIG. 2 is a diagram illustrating one example of an imaging system according to one embodiment of the present invention.

FIG. 2 is a diagram illustrating an image sensor system 200 fulfilling the function of Analog block 120 in FIG. 1 and including a pixel array 202 having a plurality of image sensor pixels included in an example integrated circuit system with features in accordance with the teachings of an embodiment of the present invention. As shown in the depicted example, imaging system 200 includes pixel array 202 coupled to control circuitry 208 and readout circuitry 204, which is coupled to function logic 206.

The control circuitry 208 may include a row decoder and a row driver with required timing to circuits, while readout circuitry 204 may include a column decoder and a column driver with required timing circuits. The control circuitry 208 and the readout circuitry 204 are in addition coupled to state register 212. In one example, the pixel array 202 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. Pixels in a given row may share reset lines, so that a whole row is reset at a time. The row select lines of each pixel in a row may be tied together as well. The outputs of each pixel in any given column are tied together. Since only one row is selected at a given time by a decoder, no competition for the output line occurs.

In one example, after each pixel has acquired its image data or image charge, the image data is readout by readout circuitry 204 using a readout mode specified by state register or programmable logic function 212 and then transferred to function logic 206. In various examples, readout circuitry 204 may include amplification circuitry, analog-to-digital (ADC) conversion circuitry, or otherwise. State register 212 may include a digitally programmed selection system, i.e., a configuration, to determine whether readout mode is by rolling shutter or global shutter and what timing and signal levels are employed during each mode. Function logic 206 may simply store the image data or even manipulate the image data by applying post image effects (e.g., crop, rotate, remove red eye, adjust brightness, adjust contrast, or otherwise). In one example, readout circuitry 204 may readout a row of image data at a time along readout column lines (illustrated) or may readout the image data using a variety of other techniques (not illustrated), such as a serial readout or a full parallel readout of all pixels simultaneously. In one example, control circuitry 208 is coupled to pixel array 202 to control operational characteristics of pixel array 202. Some aspects of the operation of control circuitry 208 may be determined by settings present in state register 212. For example, control circuitry 208 may generate a shutter signal for controlling image acquisition. In one example, the shutter signal is a global shutter signal for simultaneously enabling all pixels within pixel array 202 to simultaneously capture their respective image data during a single acquisition window. In another example, the shutter signal is a rolling shutter signal such that each row, column, or group of pixels is sequentially enabled during consecutive acquisition windows.

Figure 3:
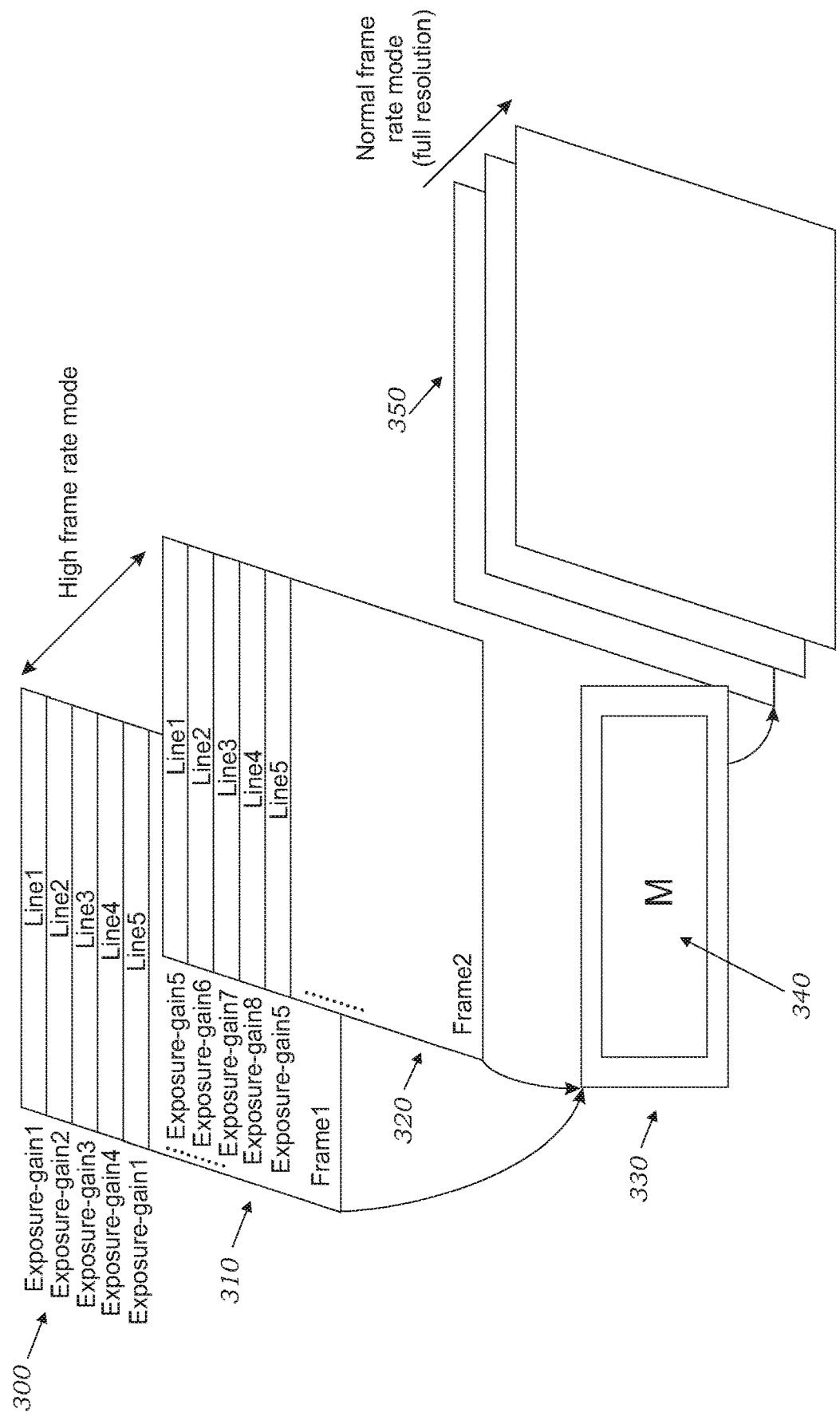
FIG. 3 is a diagram illustrating the rapid startup method according to an embodiment of the present invention.

FIG. 3 is a diagram illustrating the rapid startup method 300 according to an embodiment of the present invention. FIG. 3 illustrates two imaging frames 310 and 320 represented by two overlapped rectangles indicating frame 320 follows frame 310 in time. Frames 310 and 320 are in a high frame rate mode where high is relative to a normal frame rate of 30 fps, for example 240 fps. FIG. 3 illustrates frame 310 comprising lines scanned in a sequence Line1, Line2, Line3, Line4, Line5, and so on without indicating all the lines in frame 310 but intending to include all the lines in frame 310. FIG. 3 also illustrate that during the scan of Line1 of frame 310, initial exposure time and gain parameter pair Exposure-gain1 is applied during the readout of Line1. Likewise during the scan of Line2 of frame 310 initial exposure time and gain parameter pair Exposure-gain2 is applied during the readout of Line2. The scans of Line3 and Line4 have associated initial exposure time and gain parameter pairs Exposure-gain7 and Exposure-gain8. However, during the scan of Line5 of frame 320, initial exposure time and gain parameter pair Exposure-gain5 is applied. Although not illustrated, Exposure-gain6 is applied to Line6, Exposure-gain7 is applied to Line7, and Exposure-gain8 is applied to Line8. The same set of four pairs of initial exposure time and gain parameters are applied to repeating sets of four imaging lines until all the imaging lines of frame 310 are scanned. The four pairs of initial exposure time and gain parameters are initially set in and made available from a state memory circuit. A binning/skipping mode of the image sensor system may be employed to execute the above described repeated block of line scans using the same exposure time and gain parameters.

FIG. 3 also illustrates a next step of the invented method by showing that following the capture of the first frame of imaging data from frame 310, four average pixel brightness values are derived from the sets of lines scanned with the four initial exposure and gain values. Basically the scene is scanned in bands wherein across the bands the exposure time and gain are varied in pairs intended to bracket the full dynamic range of the image sensor. These values are derived in a function logic circuit 330 which may be resident on the image sensor chip or in a digital image processor coupled to the image sensor. These values may be derived during the frame blanking time between frame 310 and the next frame.

The invented method continues, as illustrated in FIG. 3, with the imaging of frame 320 comprising lines scanned in a sequence Line1, Line2, Line3, Line4, Line5 and so on without indicating all the lines in frame 320 but intending to include all the lines in frame 320. FIG. 3 also illustrates that during the scan of Line1 of frame 320, initial exposure time and gain parameter pair Exposure-gain5 is applied during the readout of Line1. Likewise during the scan of Line2 of frame 320 initial exposure time and gain parameter pair Exposure-gain6 is to applied during the readout of Line2. The scans of Line3 and Line4 have associated initial exposure time and gain parameter pairs Exposure-gain7 and Exposure-gain8. However, during the scan of Line5 of frame 320, initial exposure time and gain parameter pair Exposure-gain5 is applied. Although not illustrated, Exposure-gain6 is applied to Line6, Exposure-gain7 is applied to Line7, and Exposure-gain8 is applied to Line8. The same set of four pairs of initial exposure time and gain parameters are applied to repeating sets of four imaging lines until all the imaging lines of frame 320 are scanned. As with frame 310 a binning/skipping mode of the image sensor system may be employed to execute the above described repeated block of line scans using the same exposure time and gain parameters.

FIG. 3 further illustrates a next step of the invented method, showing that by following the capture of the second frame of imaging data from frame 320, four average pixel brightness values are derived from the sets of lines scanned with the four initial exposure and gain values. The four pairs of initial exposure time and gain parameters are initially set in and made available from a state memory circuit. Again, basically the scene is scanned in bands wherein across the bands the exposure time and gain are varied in pairs intended to bracket the full dynamic range of the image sensor. These values are derived in function logic circuit 330 which may be resident on the image sensor chip or in a digital image processor coupled to the image sensor.

FIG. 3 illustrates the concluding steps of the invented method by showing that function logic circuit 330 derives an optimum exposure control parameter and an optimum gain control parameter by applying a mathematical algorithm to the average brightness values associated to with the eight sets of initial exposure time and gain parameters, wherein the algorithm also employs a previously stored target image brightness value M. Target image brightness value M may be numerically about 50 to 70 and be held in state memory 340 for use by function logic circuit 330. In one embodiment, the target image brightness value M is 60. The optimum exposure control parameter and optimum gain control parameter are applied to subsequent frame scans of the image sensor, i.e., following the two fast initial frames, wherein the subsequent frames are at a rate that is more normal, for example 30 fps. Only the normal rate imaging data is presented to the system user. The illustrated method then accomplishes a rapid startup of the image sensor by acquiring imaging data during two fast frame rate capture frames using predetermined exposure time and gain parameter pairs, and then deriving an optimum set of exposure time and gain parameters based on average image brightness values captured and compared to a pre-stored target image brightness, and applying the optimum parameters to image capture at normal frame rates.

Figure 4:
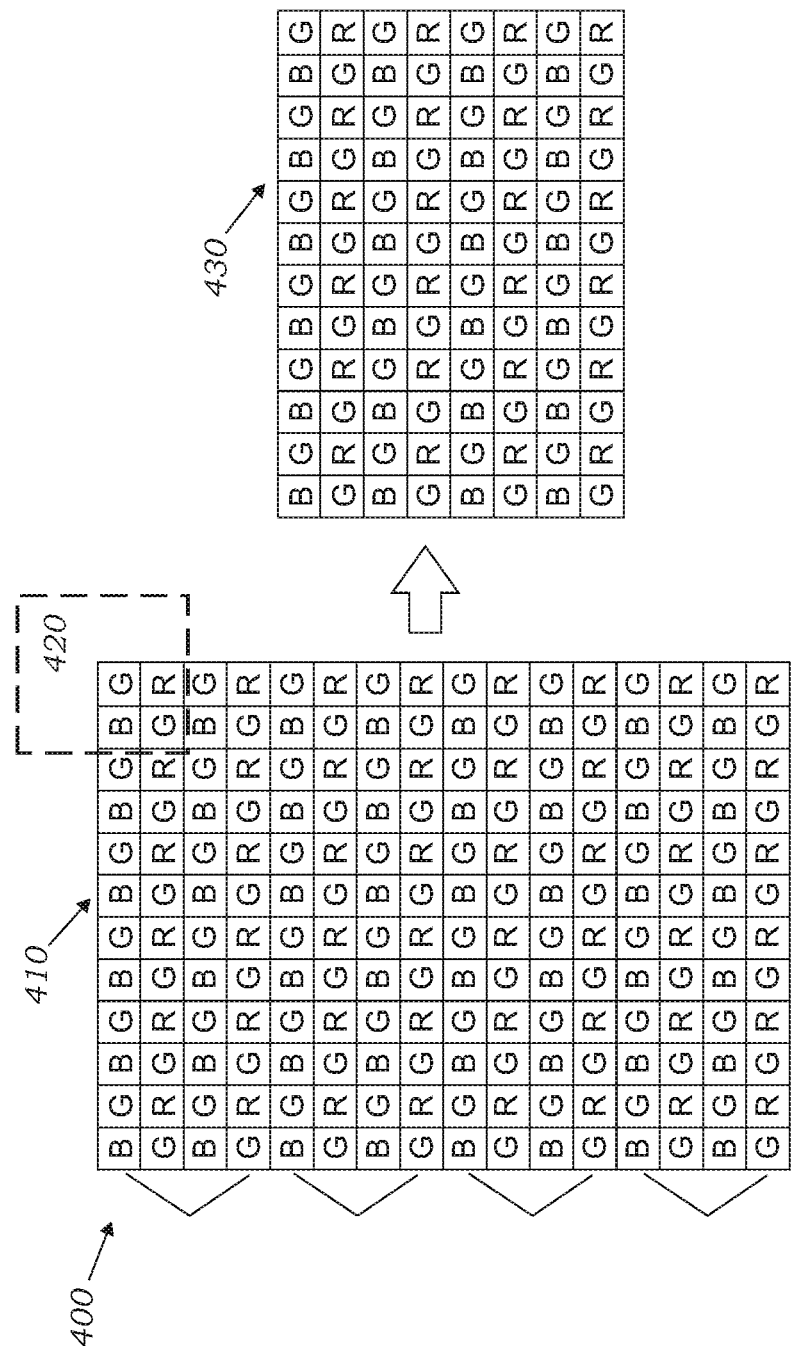
FIG. 4 is a diagram illustrating a pixel skipping and binning process enabling the rapid startup method according to an embodiment of the present invention.

FIG. 4 is a diagram illustrating a pixel skipping and binning process enabling the rapid startup method according to an embodiment of the present invention. Binning/skipping mode 400 is illustrated in FIG. 4 where full sized pixel array 410 consists of repeated Bayer pattern 420 blocks of pixels, and is scanned in such a way as to combine every two rows of Bayer pattern blocks into one Bayer pattern row at readout. This may be called a ½ binning/skip mode and the result is an image data output frame consisting of array 430.

Figure 5:
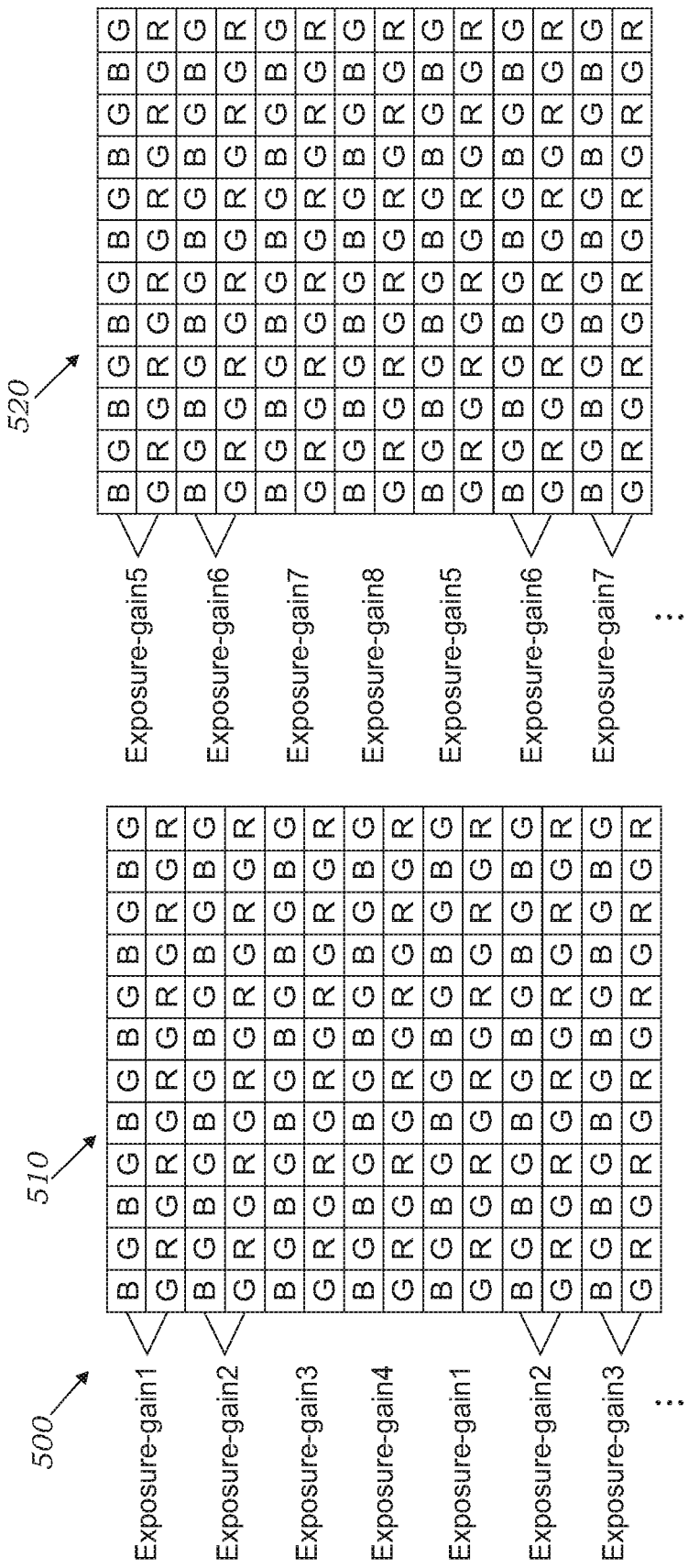
FIG. 5 is a diagram illustrating a pixel skipping and binning process enabling the rapid startup method according to an embodiment of the present invention.

FIG. 5 is a diagram illustrating a pixel skipping and binning process enabling the rapid startup method according to an embodiment of the present invention. A binning/skipping to mode 500 is illustrated in FIG. 5 shows the first fast frame 510 and the second fast frame 520 of the invented method. Exposure time and gain parameters (e.g., Exposure-gain1, Exposure-gain2, etc.) are applied to the associated rows of Bayer block rows in frame 510. Exposure time and gain parameters (e.g., Exposure-gain4, Exposure-gain5, etc.) are applied to the associated rows of Bayer block rows in frame 520. These assignments go on repeating every four Bayer block rows throughout each frame as described in reference to FIG. 3. The binning/skipping mode employed in one embodiment of the invention is such that the image data read out is $1/16^{th}$ of the full resolution of the frame and the fast frame rate is 240 fps while the normal resolution frame rate is 30 fps.

FIG. 6 illustrates a pair of tables 600 identifying the eight pairs of initial exposure time and gain parameters and their product levels enabling the rapid startup method, according to an embodiment of the present invention. Table 610 shows the eight pairs of exposure time and gain parameters comprising Exposure-gain1 (abbreviated as Ex-gain1 here) through Exposure-gain8, as shown in FIG. 3. Adjustments may be made to the parameter values depending on the specific sensor used or the characteristics of the scenes of interest. The range of the values is chosen to cover all situations from very dark scenes to very bright scenes. Table 620 shows the multiplication products of each initial exposure time and its gain parameter pair and is termed a $Level_i$ where (i) is an integer from 1 to 8. For example, $Level_1$ is 36 and it corresponds to Ex-gain1 and is the product of exposure time and gain parameter pair Ex-gain1, i.e., exposure 4 and gain 9. The levels decrease to one third (⅓) of their value at each step through the table (i.e., 36 to 12 to 4 etc.). In as much as the initial exposure time and gain parameters are determined ahead of time and provided at the start of the method, so too are their product levels.

According to the invented method the function logic or digital image processor records the average image pixel brightness responses $Avg_i$ (i=1 to 8) which correspond to the application of the eight pairs of initial exposure time and gain parameters and their product levels Level during the first two fast frames. Then the function logic or digital image processor creates an image response brightness relationship curve based on the eight pairwise products Levels and their corresponding average brightness values $Avg_i$.

Figure 7:
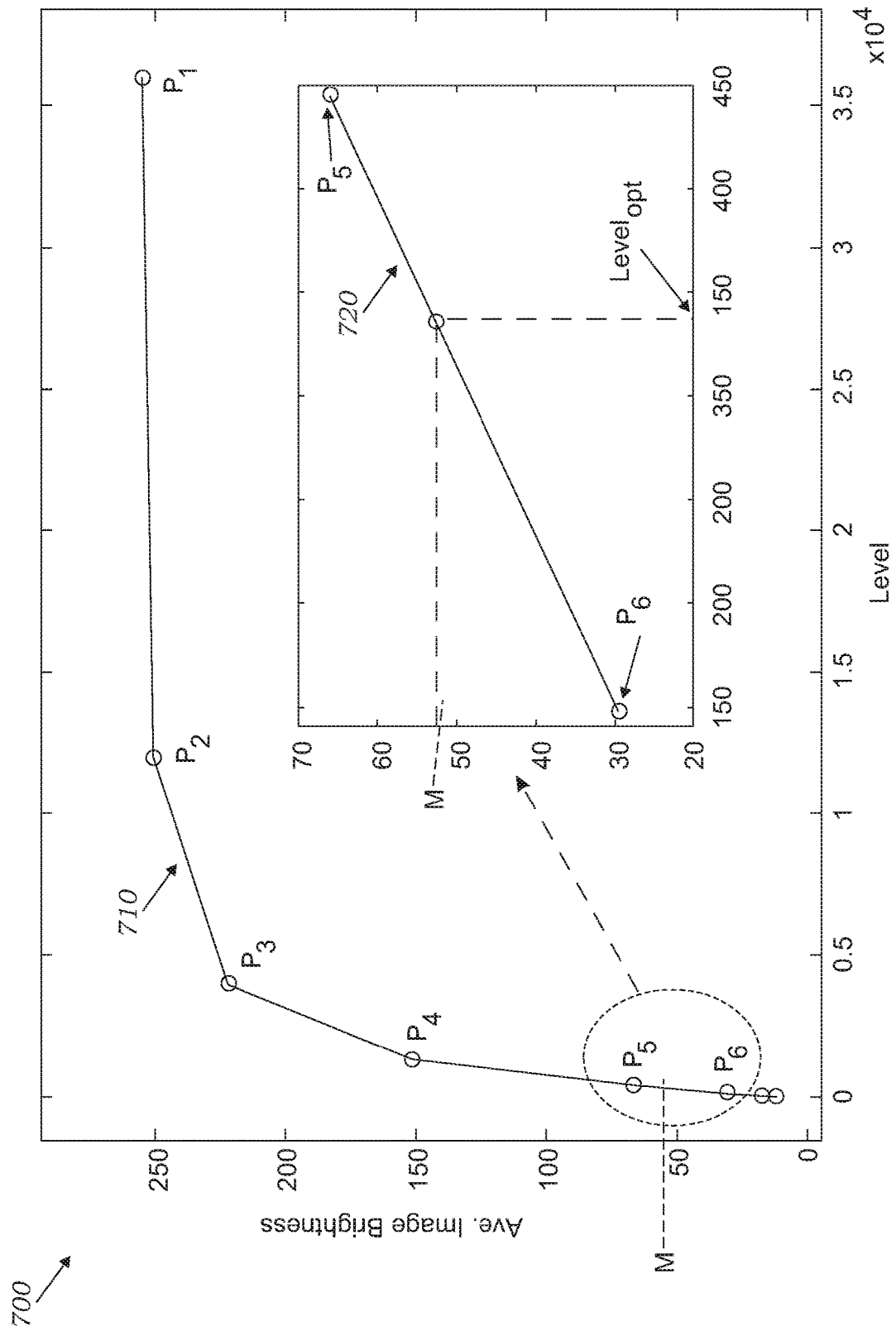
FIG. 7 illustrates image response brightness relationship curves used to determine optimum exposure time and gain parameters according to an embodiment of the invention.

FIG. 7 illustrates image response brightness relationship curves 700 used in the invented method to determine optimum exposure time and gain parameters. Curve 710 depicts the relationship between the captured average image brightness values and the product (Level) of the corresponding initial exposure time and gain parameters. Points $P_1$ through $P_8$ fall on curve 710 at points corresponding to the products (level) of initial exposure time and gain parameter pairs Ec-gain1 through Ex-gain8. Also shown on curve 710 is the average value where the target image brightness value M falls. In order to determine the optimum exposure time and gain settings corresponding to level M, the invented method first calculates optimum level $Level_{opt}$ by completing a linear interpolation algorithm using the two points on curve 710 which bracket value M. As illustrated in FIG. 7, the point with average image brightness value M lies between points P5 and P6. Curve 720 shows a graphical linear interpolation wherein Level is determined based on the given value M and the known data points $P_5$ and $P_6$. More generally level M would lie between a point Pi, with average image brightness $Avg_i$ and pair Ex-$gain_i$ with product $Value_i$, and a point $P_{i+1}$ with average image brightness $Avg_{i+1}$ and pair Ex-$gain_{i+1}$ with product $Value_{i+1}$. $Level_{opt}$ is then more generally derived using mathematical algorithm:

$$Level_{opt} = \frac{(Avg_{i+1} - M) \times Level_i (M - Avg_i) \times Level_{i+1}}{(Avg_{i+1} - Avg_i)}$$

Lastly, once the quantity $Level_{opt}$ has been determined, it remains to split it into target exposure time and target gain parameters for use during the subsequent normal frame rate imaging frames. An additional algorithm using less than and greater than or equal to criteria is utilized to complete this parsing of $Level_{opt}$ as follows:

$$exposure = \begin{cases} Level_{opt} & Level_{opt} < T \\ T & Level_{opt} \geq T \end{cases}, gain = \begin{cases} 1 & Level_{opt} < T \\ Level_{opt}/T & Level_{opt} \geq T \end{cases}$$

Here, since the normal working mode uses the normal frame rate of 30 fps, T=33 ms. Once this second algorithm is used to determine the target exposure time and gain parameters they are held in a register memory and used to operate the imaging system in its normal mode to output full sized normal resolution images. There may be further adjustments to the exposure time and gain as determined by the normal AEC and AEG operation. However, since the exposure time and gain parameters are near optimum at the start of normal imaging, there will be time saved related to any normal mode final adjustments which further contributes to a rapid startup of the imaging system.

In summary the invented method provides a method having advantages not taught by the prior art for rapidly starting up an imaging system, in about 10 ms, by reducing the time required to acquire the AEC and AGC parameters required for visually appealing imaging. The method employs an initial fast frame rate and binning and skipping to determine AEC and AGC parameters for use in subsequent normal frame rate imaging.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A method for starting up an image sensing system within at least one fast imaging frame, the method comprising the steps of:
   providing a pre-stored target image brightness value and a plurality of pairs of exposure time parameter initial values and exposure gain parameter initial values within a function logic circuit;
   initiating an at least one imaging frame at a high frame rate comprising a binning/skipping mode;
   capturing imaging data from the at least one fast imaging exposure frame while using the plurality of pairs of exposure time parameter initial value and exposure gain parameter initial value to output the image data to the function logic circuit;
   determining a plurality of average pixel brightness values associated with the imaging data;
   determining target exposure time and target exposure gain parameters based on the application of mathematical algorithms to the plurality of average pixel brightness values, the pre-stored target image brightness value, and the pairwise products of the pairs of exposure time and exposure gain parameter initial values; and
   starting up the image sensing system by applying the target exposure time and target exposure gain parameters during the capture of imaging data from subsequent imaging exposure frames at a normal frame rate, wherein the normal rate imaging exposure is longer than the fast imaging exposure frame.

2. The method of claim 1 wherein the number of the plurality of pairs of exposure time parameter initial values and exposure gain parameter initial values is at least six, and the number of the plurality of average pixel brightness values is at least six.

3. The method of claim 1, wherein an image sensing system is started up within at least two fast imaging frames, comprising the steps of:
   providing a pre-stored target image brightness value and a first plurality of pairs of exposure time parameter initial value and exposure gain parameter initial value and a second plurality of pairs of exposure time parameter initial value and exposure gain parameter initial value within a function logic circuit;
   initiating a first imaging frame at a high frame rate comprising a binning/skipping mode to capture a first plurality of lines of image data;
   capturing imaging data from the first fast imaging exposure frame while using the first plurality of pairs of exposure time parameter initial value and exposure gain parameter initial value to output the image data to the function logic circuit;
   determining a first plurality of average pixel brightness values associated with the first captured imaging data and corresponding to the first plurality of pairs of exposure time and gain initial values;
   initiating a second imaging frame at a high frame rate comprising a binning/skipping mode to capture a second plurality of lines of image data;
   capturing imaging data from the second fast imaging exposure frame while using the second plurality of pairs of exposure time parameter initial value and exposure gain parameter initial value and outputting the image data to the function logic circuit;
   determining a second plurality of average pixel brightness values associated with the second captured imaging data and corresponding to the second plurality of pairs of exposure time and gain initial values;
   determining an optimum target exposure time parameter and target exposure gain parameter based on the application of mathematical algorithms to the plurality of average pixel brightness values, the pre-stored target brightness value and the pairwise products or levels of the plurality of pairs of exposure time and exposure gain parameter initial values; and
   starting up the image sensing system by applying the optimum target exposure time and target exposure gain parameters during the capture of imaging data from subsequent imaging exposure frames at a normal frame rate, wherein the normal rate imaging exposure is longer than the fast imaging exposure frame.

4. The method of claim 3 wherein the numbers of the first plurality of pairs and the second plurality of pairs of exposure time parameter initial value and exposure gain parameter initial value are each four; the numbers of the first plurality of and the second plurality of lines of image data are each at last four; and the numbers of the first plurality of and the second plurality of average pixel brightness values are each four.

5. The method of claim 1 wherein a startup flag bit stored in a register memory is reset as "1" from "0" when the target exposure time parameter and target exposure gain parameter are determined.

6. The method of claim 1 wherein determining the optimum target exposure time and gain parameters comprises the steps of:

creating an image response brightness relationship curve based on the first and second plurality of pairwise products or levels and their corresponding average brightness values;

identifying the two pairwise products (Leveli) and (Leveli+1), of the first and second plurality of pairwise products on the relationship curve, which bracket the pre-stored target average image brightness value; and determining by a two point linear interpolation a product $\text{level}_{opt}$ of an optimum exposure time and gain parameter associated with the pre-stored target average image brightness value.

7. The method of claim 6 wherein determining the exposure time parameter and gain parameter product optimum level $\text{level}_{opt}$ and the associated target exposure time parameter exposure and the target gain parameter gain is achieved by satisfying the following mathematical algorithms:

$$\text{Level}_{opt} = \frac{(Avg_{i+1} - M) \times \text{Level}_i (M - Avg_i) \times \text{Level}_{i+1}}{(Avg_{i+1} - Avg_i)}$$

$$\text{exposure} = \begin{cases} \text{Level}_{opt} & \text{Level}_{opt} < T \\ T & \text{Level}_{opt} \geq T \end{cases} \quad \text{gain} = \begin{cases} 1 & \text{Level}_{opt} < T \\ \text{Level}_{opt}/T & \text{Level}_{opt} \geq T \end{cases}$$

wherein M is the pre-stored target image brightness value and $Avg_i$ and $Avg_{i+1}$ are the average pixel brightness values corresponding to pairwise products (Leveli) and (Leveli+1) and wherein T is the reciprocal of the normal frame rate.

8. The method of claim 1 wherein the pairwise products of the first and second plurality of pairs of exposure time and exposure gain parameter initial values have a three-fold decreasing relationship between the first to the last product.

9. The method of claim 1 wherein the first pair of exposure time parameter and gain parameter initial values is exposure time parameter 4 ms and exposure gain parameter 9 and the last pair of exposure time parameter and gain parameter initial values is exposure time parameter 0.017 ms and exposure gain parameter initial value 1.

10. The method of claim 1 wherein the pre-stored target image brightness value is 60.

11. The method of claim 1 wherein the high frame rate including a binning/skipping mode is such that the resolution of the sensor read out data is 1/16 of the normal resolution, the high frame rate is 240 fps, and the normal frame rate is 30 fps.

12. The method of claim 1 wherein the image data is read out in a rolling shutter readout mode.

13. An imaging system with a startup mode allowing startup within at least two fast imaging frames, the imaging system comprising:

an imaging pixel array with readout controlling circuits including automatic exposure control and automatic gain control capable of a fast frame rate and a normal frame rate readout mode;

a logic function circuit, with state registers holding exposure control and gain parameter initial values and a target image pixel brightness value, configured to apply mathematical algorithms to image brightness data; and wherein the imaging system, within at least two fast imaging frames, performs a start up method comprising the steps of:

providing a pre-stored target image brightness value and a first plurality of pairs of exposure time parameter initial values and exposure gain parameter initial values and a second plurality of pairs of exposure time parameter initial values and exposure gain parameter initial values within a function logic circuit;

initiating a first imaging frame in a high frame rate comprising a binning/skipping mode to capture a first plurality of lines of image data;

capturing imaging data from the first fast imaging exposure frame while using the first plurality of pairs of exposure time parameter initial values and exposure gain parameter initial values to output the image data to the function logic circuit;

determining a first plurality of average pixel brightness values associated with the first captured imaging data and corresponding to the first plurality of pairs of exposure time and gain initial values;

initiating a second imaging frame in a high frame rate comprising a binning/skipping mode to capture a second plurality of lines of image data;

capturing imaging data from the second fast imaging exposure frame while using the second plurality of pairs of exposure time parameter initial values and exposure gain parameter initial values and outputting the image data to the function logic circuit;

determining a second plurality of average pixel brightness values associated with the second captured imaging data and corresponding to the second plurality of pairs of exposure time and gain initial values;

determining an optimum target exposure time parameter and target exposure gain parameter based on the application of mathematical algorithms to the plurality of average pixel brightness values, the pre-stored target brightness value and the pairwise products or levels of the first and second plurality of pairs of exposure time and exposure gain parameter initial values; and starting up the image sensing system by applying the optimum target exposure time and target exposure gain parameters during the capture of imaging data from subsequent imaging exposure frames at a normal frame rate, wherein the normal rate imaging exposure is longer than the fast imaging exposure frame.

14. The imaging system of claim 13 wherein the numbers of the first plurality of pairs and the second plurality of pairs of exposure time parameter initial value and exposure gain parameter initial value are each four; the numbers of the first plurality of and the second plurality of lines of image data are each at last four; and the numbers of the first plurality of and the second plurality of average pixel brightness values are each four.

15. The imaging system of claim 13 wherein a startup flag bit stored in a register memory is reset as "1" from "0" when the target exposure time parameter and target exposure gain parameter are determined.

16. The imaging system of claim 13 wherein further to the startup method the pairwise products of the first and second plurality of pairs of exposure time and exposure gain parameter initial values have a three-fold decreasing relationship between the first to the last product and wherein the first pair of exposure time parameter and gain parameter initial values is exposure time parameter 4 ms and exposure gain parameter 9 and the last pair of exposure time parameter and gain parameter initial values is exposure time parameter 0.017 ms and exposure gain parameter initial value 1.

17. The imaging system of claim 13 wherein the startup method further comprises the steps of:

creating an image response brightness relationship curve based on the plurality of pairwise products or levels and their corresponding average brightness values;

identifying the two pairwise products (Leveli) and (Leveli+1), of the plurality of pairwise products on the relationship curve, which bracket the pre-stored target average image brightness value; and determining by a two point linear interpolation a product level$_{opt}$ of an optimum exposure time and gain parameter associated with the pre-stored target average image brightness value.

18. The imaging system of claim 17 wherein determining the exposure time parameter and gain parameter product optimum level level$_{opt}$ and the associated target exposure time parameter exposure and the target gain parameter gain is achieved by satisfying the following mathematical algorithms:

$$\text{Level}_{opt} = \frac{(Avg_{i+1} - M) \times \text{Level}_i (M - Avg_i) \times \text{Level}_{i+1}}{(Avg_{i+1} - Avg_i)}$$

$$\text{exposure} = \begin{cases} \text{Level}_{opt} & \text{Level}_{opt} < T \\ T & \text{Level}_{opt} \geq T \end{cases} \quad \text{gain} = \begin{cases} 1 & \text{Level}_{opt} < T \\ \text{Level}_{opt}/T & \text{Level}_{opt} \geq T \end{cases}$$

wherein M is the pre-stored target image brightness value and Avg$_i$ and Avgi$_{+1}$ are the average pixel brightness values corresponding to pairwise products (Leveli) and (Levei+1) and wherein T is the reciprocal of the normal frame rate.

19. The imaging system of claim 13 wherein the pre-stored target image brightness value is 60.

20. The imaging system of claim 13 wherein the high frame rate including a binning/skipping mode is such that the resolution of the sensor read out data is 1/16 of the normal resolution, the high frame rate is 240 fps and the normal frame rate is 30 fps.

* * * * *